United States Patent [19]

Taniguchi et al.

[11] Patent Number: 4,794,012

[45] Date of Patent: Dec. 27, 1988

[54] METHOD OF MANUFACTURING DRIED RICE WITH PREGELATINIZED STARCH CONTENT

[75] Inventors: Morio Taniguchi, Nabari; Ryusuke Nakanaga, Takatsuki; Noriko Yano, Kawachinagano, all of Japan

[73] Assignee: House Food Industrial Company Limited, Higashiosaka, Japan

[21] Appl. No.: 10,435

[22] Filed: Feb. 3, 1987

[30] Foreign Application Priority Data

Feb. 6, 1986 [JP] Japan .................................. 61-24862

[51] Int. Cl.$^4$ .............................................. A23L 1/10
[52] U.S. Cl. .................................... 426/462; 426/508; 426/510
[58] Field of Search ............... 426/462, 461, 507, 508, 426/510

[56] References Cited

U.S. PATENT DOCUMENTS 2,733,147  1/1956  Ozai-Durrani ...................... 426/462
2,752,247  6/1956  Chandler ............................ 426/508

FOREIGN PATENT DOCUMENTS 766822  1/1957  United Kingdom .
1203315  8/1970  United Kingdom .

Primary Examiner—George Yeung
Attorney, Agent, or Firm—Oblon, Fisher, Spivak, McClelland & Maier

[57] ABSTRACT

A method of manufacturing dried rice with a pregelatinized starch content which comprises the steps of:
  (a) soaking polished rice in water having a temperature below 30° C.;
  (b) soaking the polished rice resulting from said step (a) in warm water having a temperature between 50° and 70° C.;
  (c) steam cooking the polished rice resulting from said step (b); and
  (d) drying the polished rice resulting from said step (c). The method allows the dried rice to be made edible within a short period, and allows the rice to be processed without making the surface of the rice grains too sticky, and thus provides constantly high yields with low energy costs.

18 Claims, No Drawings

METHOD OF MANUFACTURING DRIED RICE WITH PREGELATINIZED STARCH CONTENT

FIELD OF THE INVENTION

The present invention relates to a new method for manufacturing dried rice with a pregelatinized starch content, and more particularly to a method of this kind which allows the rice to be made edible readily when it is cooked by heating in a microwave over or the like.

BACKGROUND OF THE INVENTION

With the development of food processing techniques, various types of foods that may be kept for extended periods have been developed and sold on the market. These foods can be cooked by a simple means and within a short time, while providing the original taste. There have also been developments with respect to cooked rice, and various types of products and manufacturing methods are already known.

For instance, Japanese Patent Publication No. 34730/1971 discloses a method of manufacturing "instant rice", and Japanese Patent Publication No. 43222/1982 discloses a method of manufacturing rice for storage. However, these methods suffer from the following problems. Although the former method is capable of providing dried rice with a high content of pregelatinized starch, it necessitates steaming and boiling the rice over a long time period, and is thus disadvantageous with respect to the demand for reducing energy costs. The latter method necessitates steps which may lead to loss of the pregelatinized content typical of such steps being a boiling step, thus resulting in a reduction of the yield.

SUMMARY OF THE INVENTION

Accordingly, an object of the present invention is to provide a method of manufacturing dried rice with a high pregelatinized starch content which allows the rice to be made edible within a short period, and which allows the rice to be processed without making the surface of the rice grains too sticky, and thus provides constantly high yields with low energy costs.

The present invention has been accomplished on the basis of the finding that if polished rice is soaked in warm water having a predetermined temperature after the rice has been soaked in cold water and before it is steamed and boiled, the content of pregelatinized starch can be increased while the grains' surface is prevented from becoming too sticky, accordingly also preventing any reduction in the yield, even if the period during which the rice is to be steamed and boiled is short.

DETAILED DESCRIPTION OF THE PREFERRED EMBODIMENTS

The present invention provides a method for manufacturing dried rice with a pregelatinized starch content which comprises the the steps of: (a) soaking polished rice in water having a temperature below 30° C.; (b) soaking the polished rice resulting from the step (a) in warm water having a temperature between 50° and 70° C.; (c) steam cooking the polished rice resulting from the step (b); and (d) drying the polished rice resulting from the step (c).

The method of the invention will now be described in detail.

(a) Water Soaking Process

According to the method of the present invention, polished rice is first soaked in water having a temperature below 30° C.

Rice which has previously been washed is normally used as the polished rice. The water in which the rice is to be soaked should have a temperature below 30° C. This will allow the polished rice to absorb water uniformly. Preferably, the temperature of the water should be within the range between 10 and 20° C. This will allow the speed at which water is absorbed to be kept at an appropriate value and prevent propagation of bacteria during soaking. The period of soaking is normally about 1 to 16 hours. From the viewpoint of obtaining a uniform moisture distribution in the resulting rice as well as a high degree of production efficiency, and of preventing putrefaction, the water soaking period should preferably be about 2 to 4 hours.

The moisture content in the polished rice thus obtained normally ranges between about 30 and 40%.

(b) Warm Water Soaking Process

In this process, the polished rice containing about 30 to 40% moisture following soaking in cold water is soaked in warm water having a temperature between 50° and 70° C.

By virtue of soaking the polished rice in warm water having a temperature between 50° and 70° C., the moisture content of the rice can be increased within a relatively short period. This makes it possible to prevent eluation of critical ingredients in the polished rice such as nutritious contents, and also to prevent rapid pregelatinization from taking place on the surface of the rice, thus preventing water absorption from being impeded by a film of glue which would otherwise be formed on the surface of the rice, preventing the handling of the rice from becoming difficult due to increased stickiness of the rice grains.

The soaking period should normally be less than about 3 hours. This will make it possible to prevent eluation of critical ingredients and propagation of bacteria. The soaking period should preferably be about 30 minutes to 90 minutes.

The moisture content of the polished rice which has thus been obtained normally ranges between about 40 and 65%. By virtue of having a moisture content within this range, pregelatinization in the ensuing steam cooking step will be completed to an adequate degree within a short period, and accordingly it will be possible to prevent eluation of critical ingredients, and formation of a coarse surface or breakage of the rice.

(c) Steam Cooking Process

In this process, the polished rice having a moisture content of 40 to 50% following the warm water soaking is steamed and boiled. This steam cooking can be performed by any known method such as a one-stage steaming/boiling method or a two-stage steaming/boiling method. A one-stage steaming/boiling method is undertaken at a temperature between about 95° and 100° C., and for a period of about 5 to 20 minutes. A two-stage steaming/boiling method includes the step of water spraying or soaking for a short period between two steaming/boiling stages. If required, a seasoning stock may be used in place of water. Each steaming/boiling stage is undertaken at a temperature between 95° and 100° C., and for a period of 2 to 15 minutes.

The polished rice with a pregelatinized starch content resulting from the steam cooking process contains about 45 to 75% moisture.

(d) Drying process

In this process, the polished rice having a pregelatinized starch content and containing about 45 to 75% moisture following the steam cooking process is dried.

The conditions under which this drying process is performed are not specifically limited. A typical drying method is a hot-air drying method which is undertaken at a temperature between about 60° and 100° C., and for a period of 20 to 140 minutes. The moisture content after drying will be about 5 to 15%. Sometimes it is preferable to bring the rice grains into a loosened state at least once by shaking because this enables uniform drying, and prevents the rice grains from adhering to each other, and increases the yield.

In addition, a swelling treatment may be effected after the hot-air drying. Such swelling treatment is normally undertaken at a temperature between about 200° and 400° C., preferably between 250° and 330° C., and for a period of 7 to 30 seconds. By effecting this swelling treatment, the moisture content is reduced to about 2 to 8%.

The dried rice with a pregelatinized starch content is very suitable for use as a food for storing, and shows excellent properties which allow it to be made edible readily when cooked, for instance, by a microwave oven.

Examples of the present invention will be described below.

EXAMPLE 1

500 g of polished rice (nonglutinous rice containing 13.8% moisture) which had been washed was first soaked in water having a temperature of 15° C. for a period of 2 hours. The moisture content of the rice grains was 32.8% after this soaking. Subsequently, the resulting rice was soaked in warm water having a temperature of 65° C. for a period of one hour. The moisture content of the rice grains was 61.3% after this warm water soaking. After excessive water had been removed from the rice, it was subjected to a first steaming and boiling at a temperature of 98° C. for a period of 10 minutes, then to cold water soaking for a period of 3 minutes, followed by a second steam cooking at a temperature of 100° C. for a further period of 10 minutes. The moisture content of the grains of the resulting rice was 72.5%. The rice was then hot-air dried at a temperature of 95° C. for a period of 25 minutes. The thus dried rice was loosened, and then hot-air dried at a temperature of 80° C. for a period of 30 minutes, dried rice with a pregelatinized starch content (Example 1) produced by the method of the present invention thereby being obtained.

To 75 g of the thus obtained dried rice was added to 130 ml of water, and the rice and water were heated in a microwave oven (500 W) for a period of 4 minutes, which operation was followed by allowing the thus heated rice to settle by its own heat for 5 minutes.

Table 2 shows the properties of the thus cooked rice (i.e. whether there was any uncooked hard portion at the center, and the outer appearance), and the loss ratios experienced during the production. The loss ratios were calculated in the following manner.

Loss Ratio (1): the loss ratio during the production process

This ratio was calculated from the weight (g) of the rice used with its moisture content expressed as 8% of the total weight, and from the weight (g) of the rice when it had been dried by hot-air, using the following equation:

$$\text{Loss Ratio (1)} (\%) = \frac{\text{used rice weight (g)} - \text{dried rice weight (g)}}{\text{used rice weight (g)}}$$

Loss Ratio (2): the loss ratio during sieving of the dried rice

This ratio was calculated from the weight (g) of the hot-air dried rice and from the weight of a portion of the dried rice which passed through size 9 mesh, using the following equation:

$$\text{Loss Ratio (2)} (\%) = \frac{\text{dried rice weight (g) which passed size 9 mesh}}{\text{dried rice weight (g)}}$$

COMPARISON EXAMPLES 1 TO 4

Comparison rice samples (Comparison Examples 1 to 4) were produced by following the procedure used in Example 1 except that the soaking steps (i.e. the first soaking and the second soaking) were conducted under the conditions shown in Table 1. The results, such as the loss ratios, are shown in Table 2.

EXAMPLE 2

500 g of polished rice (glutinous rice containing 14.0% moisture) which had been washed was first soaked in water having a temperature of 15° C. for a period of 2 hours. The moisture content of the rice grains was 32.5% after this soaking. Subsequently, the resulting rice was soaked in warm water having a temperature of 65° C. for a period of 40 minutes. The moisture content of the rice grains was 58.5% after this warm water soaking. After excessive water was removed from the rice, it was subjected to a first steam cooking at a temperature of 98° C. for a period of 3 minutes, then to cold water soaking for a period of 30 seconds, followed by a second steam cooking at a temperature of 100° C. for a further period of 10 minutes.

The moisture content of the grains of the resulting rice was 72.6%. The rice was then hot-air dried at a temperature of 95° C. for a period of 25 minutes. The thus dried rice was loosened, and then hot-air dried at a temperature of 80° C. for a period of 30 minutes. Whereby dried rice with a pregelatinized starch content (Example 2) produced by the method of the present invention, was obtained.

To 75 g of the thus obtained dried rice was added 100 ml of water, and the rice and water were heated in a microwave oven (500 W) for a period of 2 minutes, which operation was followed by allowing the thus heated rice to settle by its own heat for 5 minutes.

The results such as the loss ratios are shown in Table 2.

COMPARISON EXAMPLES 5 TO 8

Comparison rice samples (Comparison Examples 5 to 8) were produced by following the procedure used in Example 2 except that the soaking steps (i.e. the first soaking and the second soaking) were conducted under the conditions shown in Table 1. The results such as the loss ratios are shown in Table 2.

TABLE 1

| STEP | FIRST SOAKING | SECOND SOAKING | FIRST STEAMING/ BOILING | WATER SOAKING | SECOND STEAMING/ BOILING | HOT-AIR DRYING |
|---|---|---|---|---|---|---|
| EXAMPLE 1 | 15° C.; 2 hr. (32.8%)* | 65° C.; 1 hr. (61.3%) | 10 min. (64.3%) | 3 min. (71.0%) | 10 min. (72.5%) | (7.8%) |
| COMPARISON EXAMPLE 1 | 15° C.; 2 hr. (32.8%) | 85° C.; 30 min. (76.0%) | 10 min. (75.8%) | 3 min. (79.6%) | 10 min. (79.5%) | (8.5%) |
| COMPARISON EXAMPLE 2 | 65° C.; 2 hr. (71.8%) | | 10 min. (72.8%) | 3 min. (76.0%) | 10 min. (76.1%) | (8.0%) |
| COMPARISON EXAMPLE 3 | 15° C.; 15 hr. (33.3%) | | 10 min. (37.6%) | 3 min. (49.1%) | 10 min. (50.1%) | (6.6%) |
| COMPARISON EXAMPLE 4 | 65° C.; 1 hr. (59.9%) | 15°C.; 2 hr. (65.3%) | 10 min. (65.3%) | 3 min. (71.3%) | 10 min. (72.6%) | (7.9%) |
| EXAMPLE 2 | 15° C.; 2 hr. (38.5%) | 65° C.; 40 min. (58.5%) | 3 min. (61.4%) | 30 sec. (66.4%) | 10 min. (66.3%) | (7.5%) |
| COMPARISON EXAMPLE 5 | 15° C.; 2 hr. (38.5%) | 85° C.; 22 min. (69.7%) | 3 min. (72.5%) | 30 sec. (72.4%) | 10 min. (72.6%) | (7.8%) |

| PROCESS | FIRST SOAKING | SECOND SOAKING | FIRST STEAMING/ BOILING | WATER SOAKING | SECOND STEAMING/ BOILING | HOT-AIR DRYING |
|---|---|---|---|---|---|---|
| COMPARISON EXAMPLE 6 | 65° C.; 2 hr. (73.4%) | | 3 min. (70.8%) | 30 sec. (71.6%) | 10 min. (72.8%) | (7.9%) |
| COMPARISON EXAMPLE 7 | 15° C.; 15 hr. (39.4%) | | 3 min. (45.0%) | 30 sec. (53.1%) | 10 min. (55.1%) | (6.8%) |
| COMPARISON EXAMPLE 8 | 65° C.; 40 min. (59.2%) | 15° C.; 2 hr. (66.6%) | 3 min. (65.2%) | 30 sec. (67.0%) | 10 min. (69.3%) | (7.6%) |

*Values within parentheses indicate the moisture content after processing.

TABLE 2

| | LOSS RATIO (1) (%) | LOSS RATIO (2) (%) | PROPERTIES AFTER BEING MADE EDIBLE | | SUMMARY |
|---|---|---|---|---|---|
| | | | HARD CENTER | OUTER APPEARANCE | |
| EXAMPLE 1 | 9.6 | 7.1 | NONE | RICE GRAINS | HAD BOTH GOOD TASTE AND GOOD TEXTURE |
| COMPARISON EXAMPLE 1 | 11.7 | 7.1 | " | RICE GRAINS | LACKED GLUTINOUSNESS WITH DRY TEXTURE |
| COMPARISON EXAMPLE 2 | 20.6 | 10.2 | " | FORMED INTO A MASS SIMILAR TO RICE CAKE | CRACKED DURING SOAKING AND WAS BRITTLE |
| COMPARISON EXAMPLE 3 | 3.9 | 1.8 | YES | RICE GRAINS | |
| COMPARISON EXAMPLE 4 | 10.2 | 10.2 | NONE | FORMED INTO A MASS SIMILAR TO RICE CAKE | BRITTLE AFTER SOAKING |
| EXAMPLE 2 | 8.8 | 10.2 | " | RICE GRAINS | HAD BOTH GOOD TASTE AND GOOD TEXTURE |
| COMPARISON EXAMPLE 5 | 14.2 | 14.2 | " | FORMED INTO A MASS SIMILAR TO RICE CAKE | EXCESSIVELY GLUEY TENDING TO AFFECT PROCESSING |
| COMPARISON EXAMPLE 6 | 13.1 | 13.1 | " | FORMED INTO A MASS SIMILAR TO RICE CAKE | CRACKED DURING SOAKING AND WAS BRITTLE |
| COMPARISON EXAMPLE 7 | 7.9 | 7.1 | YES | RICE GRAINS | |
| COMPARISON EXAMPLE 8 | 15.6 | 15.6 | NONE | FORMED INTO A MASS SIMILAR TO RICE CAKE | BRITTLE AFTER SOAKING |

EFFECTS OF THE INVENTION

The method in accordance with the present invention provides dried rice which, after having been soaked, has an increased moisture content, which is provided with an adequate content of pregelatinized starch while being steamed and boiled, and which is allowed to swell to a large degree while being dried. The thus produced dried rice can therefore be made edible readily by employing a microwave oven or by pouring hot water over it, and yet has a good taste.

In addition, according to the method of the invention, the moisture distribution after soaking can be made uniform. This enables the rice to be made edible uniformly, while eliminating any portions remaining uncooked at the center of the rice grains after making the rice edible.

Further, the moisture content can be increased without causing eluation of critical ingredients in the polished rice such as the nutritious contents and the contents which provide good taste.

In addition, the method in accordance with the present invention is advantageous in reducing the ratio of rice lost during the production process, including the sieving performed to loosen the rice grains.

We claim:

1. A method for manufacturing dried rice having a pregelatinized starch content, comprising:
   (a) soaking polished rice for a period of time of 1 to 16 hours in water having a temperature below 30° C.;
   (b) soaking the polished rice resulting from said step (a) for a period of time of 30 to 90 minutes in water having a temperature between 50° and 70° C.;
   (c) steam cooking the polished rice resulting from said step (b) at a temperature of from 95° to 100° C. for a period of time of 5 to 30 minutes; and (d) drying the polished rice resulting from said step (c).

2. The method of claim 1, wherein said steam cooking step (c) comprises steam cooking the polished rice obtained in said step (b), adding water thereto, and steam cooking the resulting rice.

3. The method of claim 1, wherein said drying step (d) comprises hot-air drying the polished rice obtained in said step (c) at a temperature of between 60° and 140° C. for a period of time of 20 to 100 minutes.

4. The method of claim 1, wherein said drying step (d) includes loosening the aggregate of the rice during the course of drying.

5. The method of claim 3, wherein said drying step (d) includes a swelling treatment performed after hot-air drying, at a temperature of between 200° and 400° C., for a period of time of 7 to 30 seconds.

6. The method of claim 1, comprising soaking a polished rice in said step (a) in water having a temperature of from 10° C. to 20° C.

7. The method of claim 1, comprising soaking the polished rice in said step (a) for a period of time of 2 to 4 hours.

8. The method of claim 1, comprising steam cooking the polished rice in said step (c) for a period of time of 5 to 20 minutes.

9. The method of claim 1, wherein said steam cooking of the polished rice in said step (c) is a two-stage steam-boiling operation, wherein each steam-boiling stage is performed at a temperature of between 95° and 100° C. for a period of time of 2 to 15 minutes.

10. A dried rice having a pregelatinized starch content composition, obtained by a process comprising the steps of:

(a) soaking polished rice for a period of time of 1 to 16 hours in water having a temperature below 30° C.;

(b) soaking the polished rice resulting from said step (a) for a period of time of 30 to 90 minutes in water having a temperature between 50° and 70° C.;

(c) steam cooking the polished rice resulting from said step (b) at a temperature of from 95° to 100° C. for a period of time of 5 to 30 minutes; and (d) drying the polished rice resulting from said step (c).

11. The composition of claim 10, wherein said steam cooking step (c) comprises steam cooking the polished rice obtained in said step (b), adding water thereto, and steam cooking the resulting rice.

12. The composition of claim 10, wherein said drying step (d) comprises hot-air drying the polished rice obtained in said step (c) at a temperature of between 60° and 140° C. for a period of time of 20 to 100 minutes.

13. The composition of claim 10, wherein said drying step (d) includes loosening the aggregate of the rice during the course of drying.

14. The composition of claim 12, wherein said drying step (d) includes a swelling treatment performed after hot-air drying, at a temperature of between 200° and 400° C., for a period of time of 7 to 30 seconds.

15. The composition of claim 10, wherein said polished rice is soaked in said step (a) in water having a temperature of from 10° C. to 20° C.

16. The composition of claim 10, wherein said polished rice is soaked in said step (a) for a period of time of 2 to 4 hours.

17. The composition of claim 10, wherein the polished rice resulting from step (b) is steam cooked in a one-step steaming-boiling operation for a period of time of about 5 to 20 minutes.

18. The composition of claim 10, wherein said polished rice resulting from step (b) is steam cooked in said step (c) in a two-stage steaming-boiling operation, where each stage of the operation is performed at a temperature of between 95° and 100° C. for a period of time of from 2 to 15 minutes.

* * * * *

UNITED STATES PATENT AND TRADEMARK OFFICE
CERTIFICATE OF CORRECTION

PATENT NO. : 4,794,012

DATED : December 27, 1988

INVENTOR(S) : Taniguchi et al

It is certified that error appears in the above-identified patent and that said Letters Patent is hereby corrected as shown below:

Column 3, lines 54-55, "To 75g of the thus obtained dried rice was added to 130ml of water, and the rice and water were" should read --130ml of water was added to 75g of the thus obtained dried rice, and the resulting mixture was--

Column 6, line 68, "30" should read --20--.

Column 7, line 10, "140°" should read --100°--;

line 11, "100 minutes" should read --140 minutes--.

Column 8, line 6, "30" should read --20--;

line 16, "140°" should read --100°--;

line 16, "100 minutes" should read --140 minutes--.

Signed and Sealed this

Twenty-fifth Day of December, 1990

*Attest:*

HARRY F. MANBECK, JR.

*Attesting Officer*

*Commissioner of Patents and Trademarks*